United States Patent [19]

Kashiwase

[11] Patent Number: 5,014,566
[45] Date of Patent: May 14, 1991

[54] AUTOMATIC TRANSMISSION FOR A MOTOR VEHICLE

[75] Inventor: Hajime Kashiwase, Tokyo, Japan

[73] Assignee: Fuji Jukogyo Kabushiki Kaisha, Tokyo, Japan

[21] Appl. No.: 358,247

[22] Filed: May 26, 1989

[30] Foreign Application Priority Data

May 31, 1988 [JP] Japan .................. 63-133831

[51] Int. Cl.⁵ .............................................. F16H 3/08
[52] U.S. Cl. ........................................ 74/331; 74/333
[58] Field of Search ................... 74/331, 329, 333

[56] References Cited

U.S. PATENT DOCUMENTS

| | | | |
|---|---|---|---|
| 1,981,236 | 11/1934 | Logne | 74/329 X |
| 4,476,737 | 10/1984 | Young | 74/329 X |
| 4,488,446 | 12/1984 | Nishikawa et al. | 74/333 X |
| 4,565,106 | 1/1986 | Sumiyoshi | 74/329 X |
| 4,807,493 | 2/1989 | Loeffler | 74/333 X |

FOREIGN PATENT DOCUMENTS

| | | | |
|---|---|---|---|
| 0088188 | 9/1983 | European Pat. Off. | 74/331 |
| 0063040 | 5/1980 | Japan | 74/331 |
| 58-170949 | 10/1983 | Japan . | |
| 0170950 | 10/1983 | Japan | 74/331 |
| 766214 | 1/1957 | United Kingdom | 74/331 |
| 2069635 | 8/1981 | United Kingdom | 74/331 |
| 2172944 | 10/1986 | United Kingdom | 74/331 |

*Primary Examiner*—Dirk Wright
*Attorney, Agent, or Firm*—Martin A. Farber

[57] ABSTRACT

A pair of counter shafts are disposed in parallel to a main shaft at opposite sides thereof, and a drive shaft is disposed below the main shaft. Main gears are secured to the main shaft, and counter gears are rotatably mounted on the counter shafts and engaged with the main gears to form change speed gears. Clutches are mounted on the counter shafts for selectively engaging counter gears with the counter shafts. A pair of counter output gears are secured to the counter shafts respectively, and a drive input gear is rotatably mounted on the drive shaft, and selectively engaged with the drive shaft by a selector. The drive shaft is operatively connected to a differential for driving wheels of a vehicle.

12 Claims, 5 Drawing Sheets

AUTOMATIC TRANSMISSION FOR A MOTOR VEHICLE

BACKGROUND OF THE INVENTION

The present invention relates to an automatic transmission for a motor vehicle, and more particularly to a trans-axle type automatic transmission, an input shaft of which extends across an axle of the vehicle.

A typical trans-axle type automatic transmission has a torque converter for transmitting the power of an engine, a planetary gear device as an automatic transmission device, the latter having an input shaft operatively connected to the torque converter, a drive shaft disposed in parallel with the input shaft, and a drive pinion formed on an end of the drive shaft being engaged with a ring gear of a differential provided in an axle system.

In recent years, the change speed pattern of the automatic transmission has become complicated as there being well as an increase of engine power. This has enlarged the size of the transmission device. Particularly, a plurality of multiple-disk clutches and one-way clutches are provided to ensure smooth transmission for various change speed patterns, causing an increase of the overall length of the transmission. As a result, the transmission device, when mounted on a vehicle, bulges into the interior space of the vehicle.

Referring to FIGS. 10 and 11, a front differential 102 of an automatic transmission 101 is disposed in front of an automatic transmission device 103. Accordingly, a rear part of the transmission device 103 projects into the interior of the vehicle so that a large upward projection 105 for disposing the transmission device 103 therein is formed on a the floor 104. Consequently, leg room is decreased by the projection 105 so that passengers feel oppressed and uncomfortable in the vehicle. Furthermore, pedals 106 for the brake and accelerator must be provided in a small space close to one another so that their operation becomes awkward.

Japanese Patent Laid Open 58-170949 discloses an automatic transmission device comprising a main shaft and two counter shafts parallel to the main shaft, on which change speed gears are mounted, thereby reducing the longitudinal length of the transmission. The transmission device is for a vehicle, the engine of which is laterally mounted on the vehicle.

SUMMARY OF THE INVENTION

The object of the present invention is to provide an automatic trans-axle type automatic transmission where the longitudinal length thereof is decreased so as to provide sufficient interior space in a vehicle.

According to the present invention, there is provided an automatic transmission for a motor vehicle comprising a torque converter operatively connected to an engine of the motor vehicle, a main shaft connected to an output member of the torque converter, a pair of counter shafts disposed in parallel to the main shaft at opposite sides thereof, and a drive shaft disposed below the main shaft and operatively connected to a differential for driving wheels of the vehicle.

Main gears are secured to the main shaft, and counter gears are rotatably mounted on the counter shafts and engaged with the main gears, respectively. The main gears and counter gears are arranged to provide a change speed gear device having at least three speeds. Clutches are mounted on the counter shafts for selectively engaging counter gears with the counter shafts. A pair of counter output gears are secured to the counter shafts respectively and a drive input gear is rotatably mounted on the drive shaft. A selector is slidably mounted on the drive shaft and provided for selectively engaging the drive input gear with the drive shaft.

In an aspect of the present invention, the clutch is a fluid-operated multiple-disk friction clutch.

These and other objects and features of this invention will become understood from the following description with reference to the accompanying drawings.

DETAILED DESCRIPTION OF THE PREFERRED EMBODIMENTS

Figure 1:
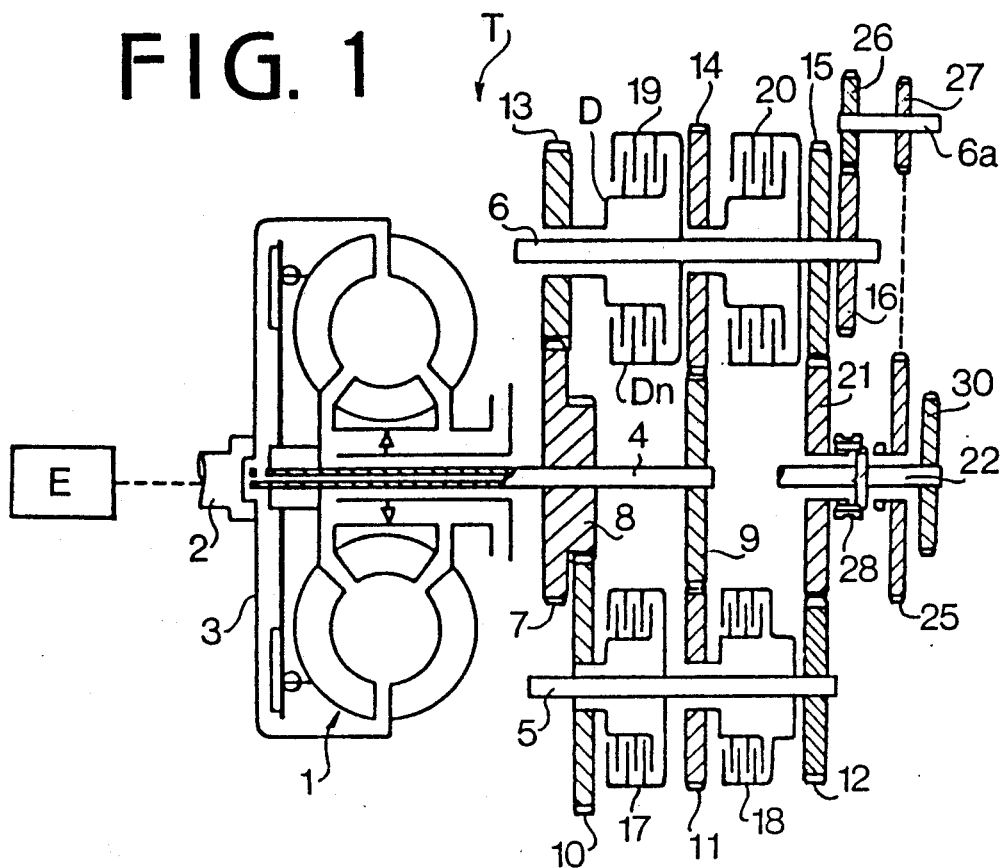
FIG. 1 is a schematic plan view of an automatic transmission of the present invention.
Figure 2:
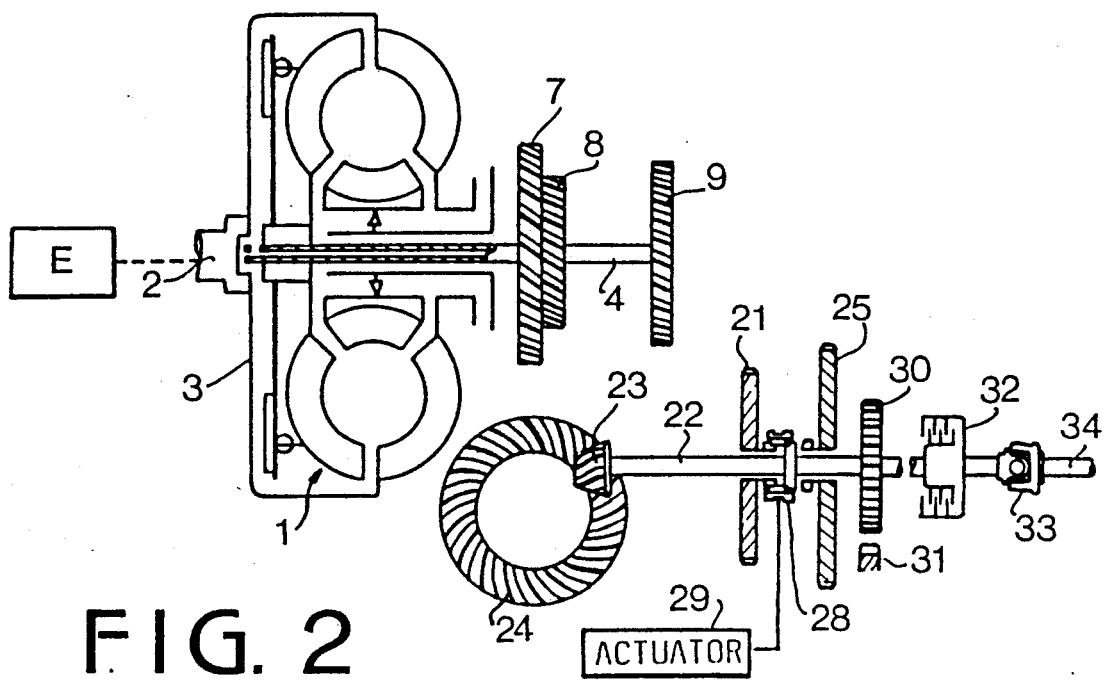
FIG. 2 is a sectional elevational view of the transmission of FIG. 1.
Figure 3:
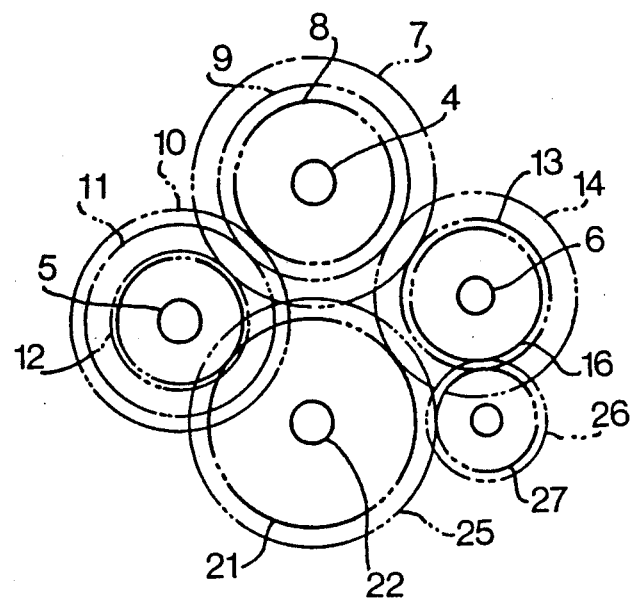
FIG. 3 is a schematic diagram of the transmission of FIG. 1 as viewed from the rear thereof.

Referring to FIG. 1 to 3, an internal combustion engine E is longitudinaly mounted on a front portion of a vehicle. A crankshaft 2 of the engine E is operatively connected to a torque converter 1 of a four-speed automatic transmission T through a drive plate 3.

The automatic transmission T comprises a main shaft 4 connected to an output member of the torque converter 1 and counter shafts 5 and 6 disposed in parallel to the main shaft at both sides thereof. Fixedly mounted on the main shaft 4 are a fourth speed main gear 7, a first speed main gear 8 and a second/third speed main gear 9 of change speed gears. On the counter shaft 5, disposed in the left side of the main shaft 4 when viewed from the rear as shown in FIG. 3, a first speed counter gear 10 meshed with the first speed main gear 8 and a second speed counter gear 11 meshed with the second/third speed main gear 9 are rotatably mounted. A counter output gear 12 is securely mounted on a rear end of the shaft 5.

On the counter shaft 6 on the other side of the main shaft 4, a fourth speed counter gear 13 in mesh with the fourth speed main gear 7 and a third speed counter gear 14 in mesh with the second/third speed main gear 9 are rotatably mounted. A counter output gear 15 and a counter reverse gear 16 are further fixedly mounted on the counter shaft 6. The counter reverse gear 16 meshes with a reverse idler gear 26 fixedly mounted on a shaft 6a on which a reverse idler gear 27 is also fixedly mounted.

The counter gears 10, 11, 13 and 14 on the counter shafts 5 and 6 are adapted to be coupled with the shafts 5 and 6 by way of fluid-operated multiple-disk friction clutches 17 to 20, respectively. Each clutch comprises a drive member D secured to the gear and a driven member Dn securely mounted on the shaft. Each clutch differs in capacity in accordance with the gear ratio of the change speed gears for which the clutch is provided. That is, the clutch for gears of a large gear ratio has a large capacity. When hydraulic pressure is applied to clutch, the drive member and the driven member are engaged, thereby coupling the gear with the shaft.

Figure 5:
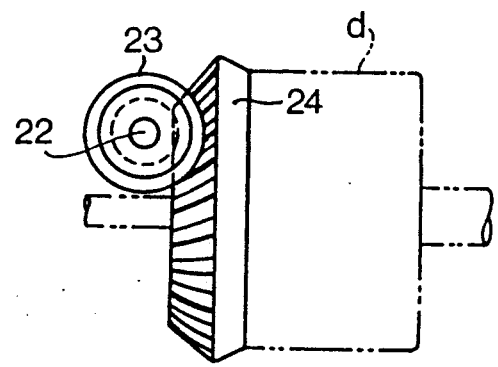
FIG. 5 is an elevation of the front differential of FIG. 4 as viewed from the rear.
Figure 7:
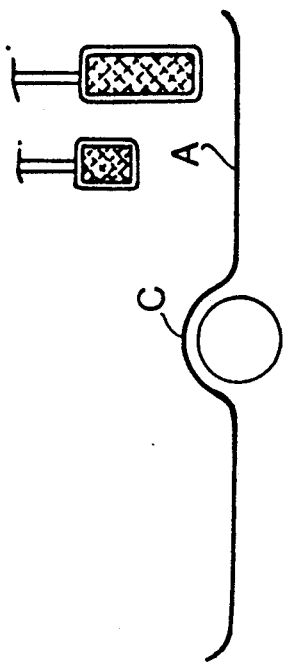
FIG. 7 is a sectional view taken along a line 7—7 of FIG. 6.

Disposed under the main shaft 4 is a drive shaft 22 on which a drive input gear 21 is rotatably mounted. As shown in FIG. 3, the drive input gear 21 meshes with the counter output gears 12 and 15 on the counter shafts 5 and 6. A drive pinion 23 at the front end of the drive shaft 22 is engaged with a ring gear 24 of a front differential "d" (FIG. 5). A drive reverse gear 25 is further rotatably mounted on the drive shaft 22. The drive reverse gear 25 engages with the idler gear 27 on the shaft 6a. A selector 28 is slidably mounted on the drive shaft 22 between the drive input gear 21 and the drive reverse gear 25. The selector 28 is mechanically operated by a servo actuator 29 so as to selectively engage with the gear 21 or the gear 25, thereby selecting forward driving or rearward driving. Since the drive input gear 21 and the drive reverse gear 25 are rotated in opposite directions, the selector 28 can not be engaged with the other gear while the gears are rotating at a high speed. Accordingly, an interlocking mechanism is provided for preventing shifting of the selector 28 when vehicle speed is higher than a predetermined speed.

Fixedly mounted on the drive shaft 22 behind the drive reverse gear 25 is a parking gear 30 which engages with a parking pawl 31 when a shift lever is shifted to a parking position.

In a transmission system of a four-wheel drive vehicle, the drive shaft 22 is further connected with a rear drive shaft 34 through a multiple-disk friction clutch 32 and a constant-velocity joint 33.

Figure 4:
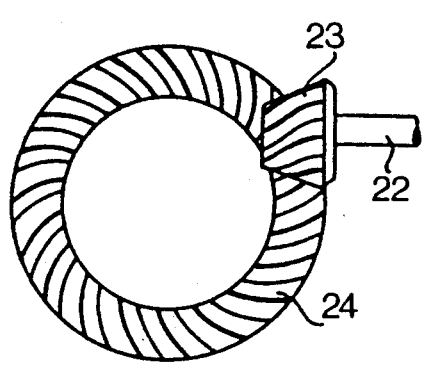
FIG. 4 is a side elevational view of a front differential.
Figure 6:
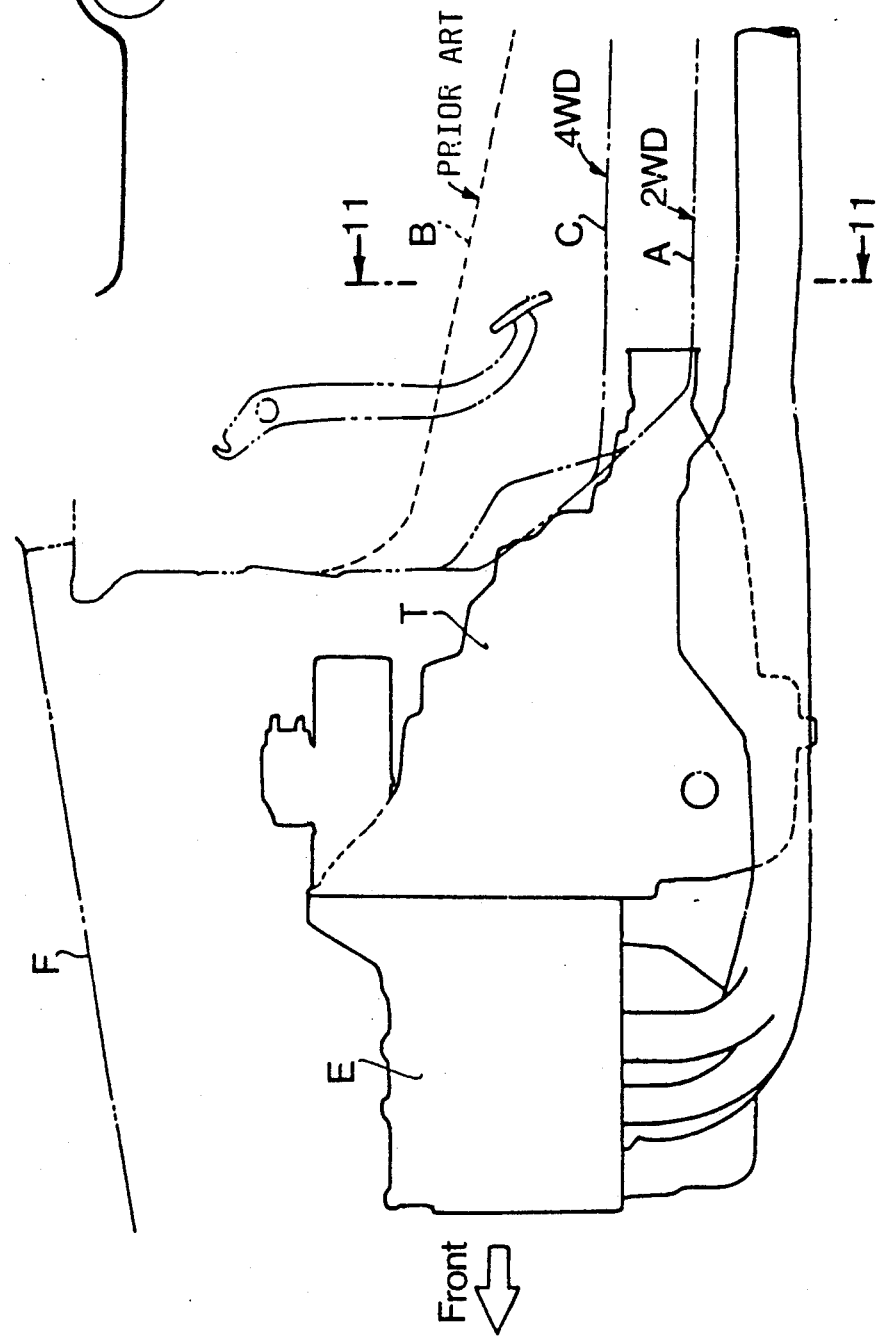
FIG. 6 is a schematic diagram of a part of a vehicle on which the transmission of the present invention is mounted.

The drive pinion 23 and the ring gear 24 are hypoid gears as shown in FIGS. 4 and 5, so that the ring gear 24 is offset to one side with respect to the main shaft 4, namely, toward the counter shaft 6. In accordance with the present invention, since the counter gears 13 and 14 of change speed gears having small gear ratios, and hence small diameters, and the clutches 19 and 20 having small clutch capacities are mounted on the counter shaft 6, sufficient lateral space for the front differential is formed under the main shaft 4. Consequently, the front differential is disposed in this space. Accordingly, the main shaft 4 can be shortened, thereby decreasing the longitudinal length of the transmission T. As a result, as shown in FIG. 6, most of the transmission T is disposed in engine room formed under a front hood F of the vehicle. Accordingly, a projection B provided for a conventional transmission, protruding into the interior space of the vehicle from a floor A, is diminished. Even in a case of a four-wheel drive vehicle, only a small protrusion C for the rear drive shaft is formed on the floor A. Thus, a sufficient interior space of the vehicle is provided.

For driving the vehicle in the forward direction, the selector 28 is engaged with the gear 21 by the actuator 29 to couple the gear 21 with the drive shaft 22. When the vehicle stops, hydraulic pressure is applied to the first speed clutch 17 for the engagement thereof by a control system (not shown), thereby coupling the first speed counter gear 10 with the counter shaft 5. Thus, power of the engine E is transmitted to the drive shaft 22 through the torque converter 1, main shaft 4, first speed main gear 8, first speed counter gear 10, clutch 17, counter shaft 5, counter output gear 12 and drive input gear 21. As the engine speed increases, the vehicle speed increases. When the vehicle speed increases to a another speed, the hydraulic pressure is applied to the second speed clutch 18 to engage it and the first speed clutch 17 is drained. Accordingly, the engine power is transmitted through the main shaft 4, second/third speed main gear 9, second speed counter gear 11, clutch 18 and counter shaft 5. The clutches 17 to 20 are thus selectively engaged with the increase of vehicle speed so as to couple the corresponding gears 10, 11, 13 and 14 with either of the counter shaft 5 or 6, thereby upshifting the transmission. When the engine speed decreases, the clutches 17 to 20 are engaged in turn in the opposite order so that the transmission is downshifted. The clutches are adapted to be drained when the next clutch starts to engage.

For driving the vehicle in reverse, the shift lever is shifted to a reverse position. When the shift lever passes a neutral position, the clutches 17 to 20 are drained. When the shift lever reaches the reverse position, the selector 28 is shifted by the actuator 29 and engaged with the drive reverse gear 25 to couple it with the drive shaft 22. Thereafter, the clutch 20 engages, and the engine power is transmitted to the drive shaft 22 through the main shaft 4, second/third main gear 9, third speed counter gear 14, clutch 20, counter shaft 6, counter reverse gear 16, reverse idler gear 26, shaft 6a, reverse idler gear 27 and drive reverse gear 25. Thus, the vehicle is driven rearwardly.

Figure 8:
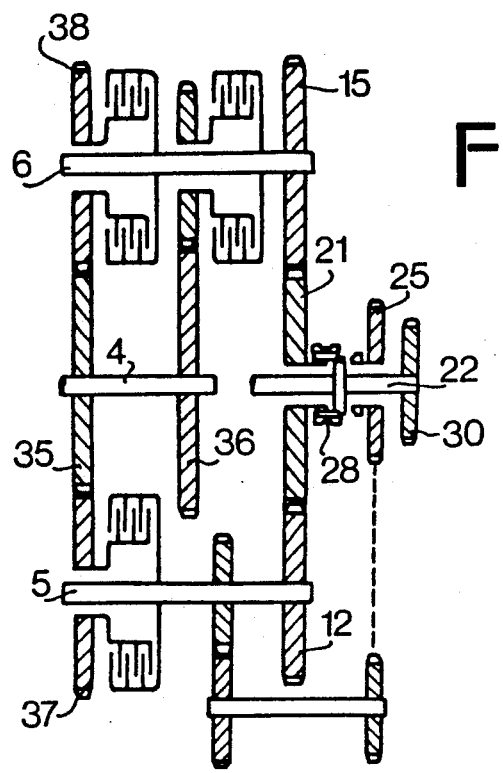
FIGS. 8 and 9 are schematic diagrams of transmissions of second and third embodiments of the present invention.

FIG. 8 shows a three-speed transmission as a second embodiment of the present invention. A first/second speed main gear 35 and a third speed main gear 36 are fixedly mounted on the main shaft 4. A first speed counter gear 37 and a second speed counter gear 38 are rotatably mounted on the shafts 5 and 6, respectively.

Figure 9:
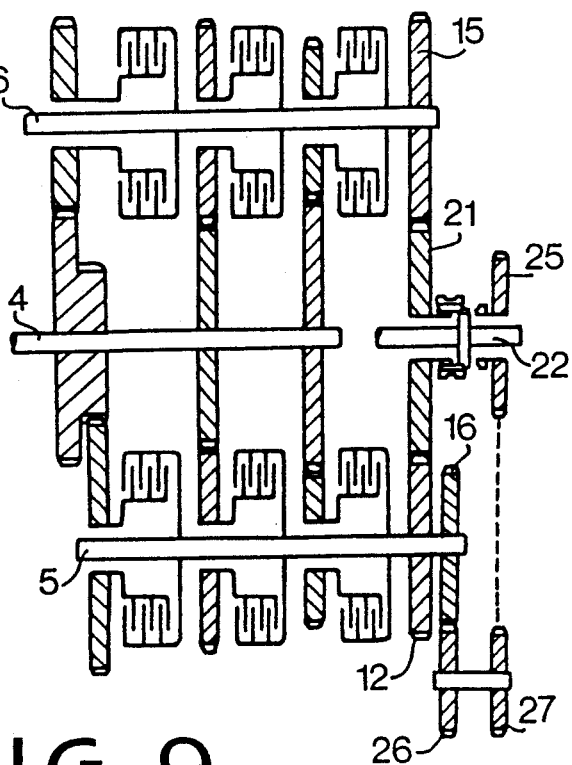
Figure 11:
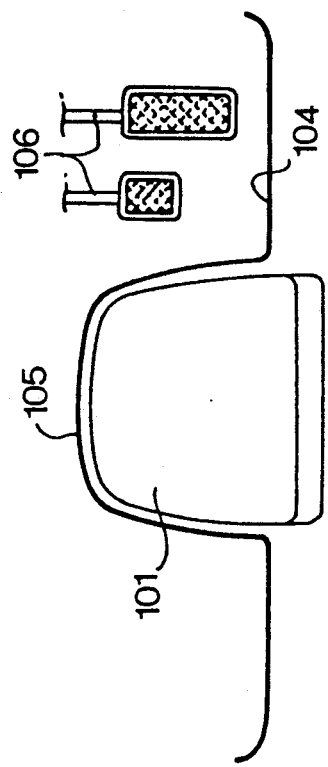
FIG. 11 is a sectional view taken along a line 11—11 of FIG. 10.
Figure 10:
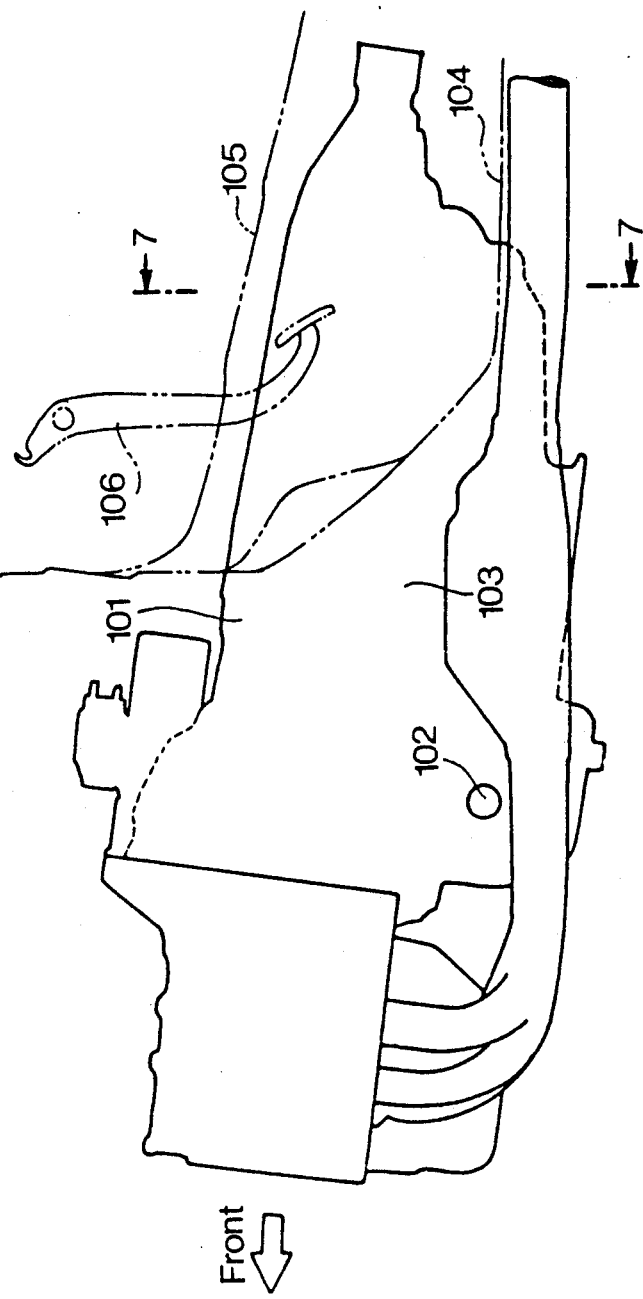
FIG. 10 is a schematic diagram of a part of a vehicle on which a conventional transmission is mounted.

The third embodiment of FIG. 9 shows a six-speed transmission.

In accordance with the present invention, since the length of the transmission is decreased, the part of the transmission which projects into the interior of the vehicle can be considerably reduced. As a result, sufficient leg room is formed in the vehicle, and a console box may be enlarged. The pedals can be disposed with an interval therebetween so as to improve the operability thereof. Furthermore, the length of the input shaft is reduced, thereby increasing the strength of the power plant and decreasing vibration of the transmission device and noise. The automatic transmission of the present invention can be easily adapted to be used for a four-wheel drive vehicle by connecting a rear drive shaft to a drive shaft.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automatic transmission for transmitting power from an engine to wheels of a motor vehicle through a differential mechanism, said transmission being longitudinally mounted on the motor vehicle and operatively connected to said engine through a torque converter, the transmission having a main shaft connected to an output member of said torque converter, a first counter shaft and a second counter shaft, both said shafts being disposed horizontally and interposing said main shaft in parallel thereto, a drive shaft disposed under said main shaft in parallel thereto, first means for transmitting the power from said first and second counter shafts to said drive shaft, and second means for transmitting the power from said drive shaft to said wheels, the transmission further comprising:

a plurality of main gears secured to said main shaft;

a plurality of counter gears rotatably mounted on said first and second counter shafts and engaged with, to be driven by, corresponding of said main gears, respectively, forming engaging pairs of said counter gears and said corresponding main gears, each of said engaging pairs having gear ratios different from each other; and a plurality of clutches mounted on said first and second counter shafts for selectively connecting corresponding of said counter gears to a corresponding of said counter shafts, respectively, respectively one of said clutches being operatable for connecting the corresponding counter gear to the corresponding counter shaft applying a corresponding one of said gear ratios.

2. The transmission according to claim 1, wherein said clutches are fluid-operated multiple-disk fraction clutches.

3. The transmission according to claim 1, wherein said first means includes counter output gears secured to rear ends of said first and second counter shafts, respectively, and a drive input gear rotatably mounted on said drive shaft meshing with both of said counter output gears.

4. The transmission according to claim 1, wherein said second means includes a pinion gear integrated with a front end of said drive shaft and a ring gear integrated with said differential mechanism and meshed with said pinion gear.

5. The transmission according to claim 3, further comprising
a selector slidably mounted on said drive shaft for engaging said drive input gear with said drive shaft in a forward running state of said vehicle.

6. The transmission according to claim 5, further comprising:
a drive reverse gear rotatably mounted on said drive shaft;
a counter reverse gear secured to said first counter shaft;
a reverse gear train operatively connecting said counter reverse gear to said drive reverse gear;
said selector engaging said drive reverse gear with said drive shaft in a reverse running state of said vehicle; and
one of said clutches mounted on said first counter shaft engaging said first counter shaft with one of said counter gears corresponding to said one of said clutches.

7. The transmission according to claim 1, further comprising:
a parking gear securely mounted on said drive shaft; and
a parking pawl engaged with said parking gear to lock operation of said transmission in a parking state of said vehicle.

8. The transmission according to claim 1, wherein said counter gears include a first counter gear for a first changing speed and a second counter gear for a second changing speed, both said first and second counter gears are mounted on one of said first and second counter shafts, and a third counter gear for a third changing speed and a fourth counter gear for a fourth changing speed, both said third and fourth counter gears are mounted on the other of said first and second counter shafts,
said main gears include a first main gear engaged with said first counter gear, a second main gear engaged with both of said second and third counter gears and a third main gear engaged with said fourth counter gear, so as to provide a four-speed transmission.

9. The transmission according to claim 6, wherein said counter gears include a first counter gear for a first changing speed, a second counter gear for a second changing speed, and a third counter gear for a third changing speed,
said first counter gear is mounted on said first counter shaft,
said second and third counter gears are mounted on said second counter shaft,
said main gears include a first main gear engaged with both of said first and second counter gears, and a second main gear engaged with the third counter gear, and
said counter reverse gear is mounted on said first counter shaft substantially opposite to said third counter gear, so as to provide a three-speed transmission.

10. The transmission according to claim 2, wherein said fluid-operated multiple-disk friction clutches include drive members and driven members, respectively, capacities of said drive and driven members are increased corresponding to increase of said corresponding gear ratios.

11. The transmission according to claim 4, wherein said counter gears include a first counter gear for a first changing speed and a second counter gear for a second changing speed, both said first and second counter gears are mounted on one of said first and second counter shafts, and have small gear ratios and small diameters, and said differential mechanism is disposed in a lateral space under said main shaft.

12. The transmission according to claim 1, wherein said main shaft is disposed higher than said counter shafts.

* * * * *